United States Patent
Cheng et al.

(10) Patent No.: US 10,552,188 B2
(45) Date of Patent: Feb. 4, 2020

(54) VIRTUAL PRIVATE CLOUD SERVICES WITH PHYSICAL MACHINE SERVERS AND VIRTUAL MACHINES

(71) Applicant: Alibaba Group Holding Limited, Grand Cayman (KY)

(72) Inventors: Gang Cheng, Bellevue, WA (US); Jiesheng Wu, Redmond, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 148 days.

(21) Appl. No.: 15/800,619

(22) Filed: Nov. 1, 2017

(65) Prior Publication Data
US 2019/0129737 A1    May 2, 2019

(51) Int. Cl.
G06F 9/44     (2018.01)
G06F 9/455    (2018.01)
H04L 29/08    (2006.01)

(52) U.S. Cl.
CPC .......... *G06F 9/45533* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2007/0180450 A1* | 8/2007 | Croft | G06F 3/1415 718/1 |
| 2011/0238820 A1* | 9/2011 | Matsuoka | G06F 9/5077 709/224 |
| 2015/0180801 A1* | 6/2015 | Casado | H04L 49/00 370/409 |
| 2016/0019085 A1* | 1/2016 | Khandekar | G06F 9/45558 718/1 |
| 2016/0057073 A1* | 2/2016 | Steinder | H04L 47/72 709/226 |
| 2016/0253211 A1* | 9/2016 | Franco | H04L 67/1097 705/7.25 |
| 2018/0123880 A1* | 5/2018 | Wen | G06F 9/45558 |
| 2018/0225095 A1* | 8/2018 | Kamalakantha | G06F 15/16 |
| 2019/0121675 A1* | 4/2019 | Smola | G06F 9/5083 |
| 2019/0129745 A1* | 5/2019 | Wang | G06F 9/45558 |

* cited by examiner

*Primary Examiner* — Insun Kang
(74) *Attorney, Agent, or Firm* — Lee & Hayes, P.C.

(57) ABSTRACT

Systems and methods provided herein are directed to providing both physical machine servers and virtual machines for public cloud virtual private cloud (VPC) services, which allow a user of the public cloud VPC services to selectively run an application on a physical machine server instead of a virtual machine.

15 Claims, 4 Drawing Sheets

VIRTUAL PRIVATE CLOUD SERVICES WITH PHYSICAL MACHINE SERVERS AND VIRTUAL MACHINES

BACKGROUND

As the need and desire for computing continue to grow in everyday experience, from a personal use such as updating one's profile in social media to lager data analysis for business, cloud computing, or cloud-based service, has become a common option for carrying out such computing tasks. Cloud computing allows users over the internet to access computing services supported by shared resources of a cloud computing provider, such as computer networks, software and applications, storage spaces, and the like.

Because Virtual Machines (VMs) provide functionality of a physical computer by emulating a computer system, the VMs can emulate and provide different types of computer operating systems and platforms. Resources for the VMs may be provided by hardware, software, or a combination of hardware and software, distributed in the cloud of the cloud service provider. Generally, public cloud service providers offer services to carry out the tasks from the users by providing only VMs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to providing both physical machine servers and virtual machines for public cloud virtual private cloud (VPC) services. The systems and methods discussed herein allow a user of the public cloud VPC services to selectively run an application on a physical machine server instead of a virtual machine. Running an application on a physical machine server may provide better performance over running the application on a virtual machine which may be realized with servers spread over the provider's cloud network and may be bandwidth limited.

Figure 1:
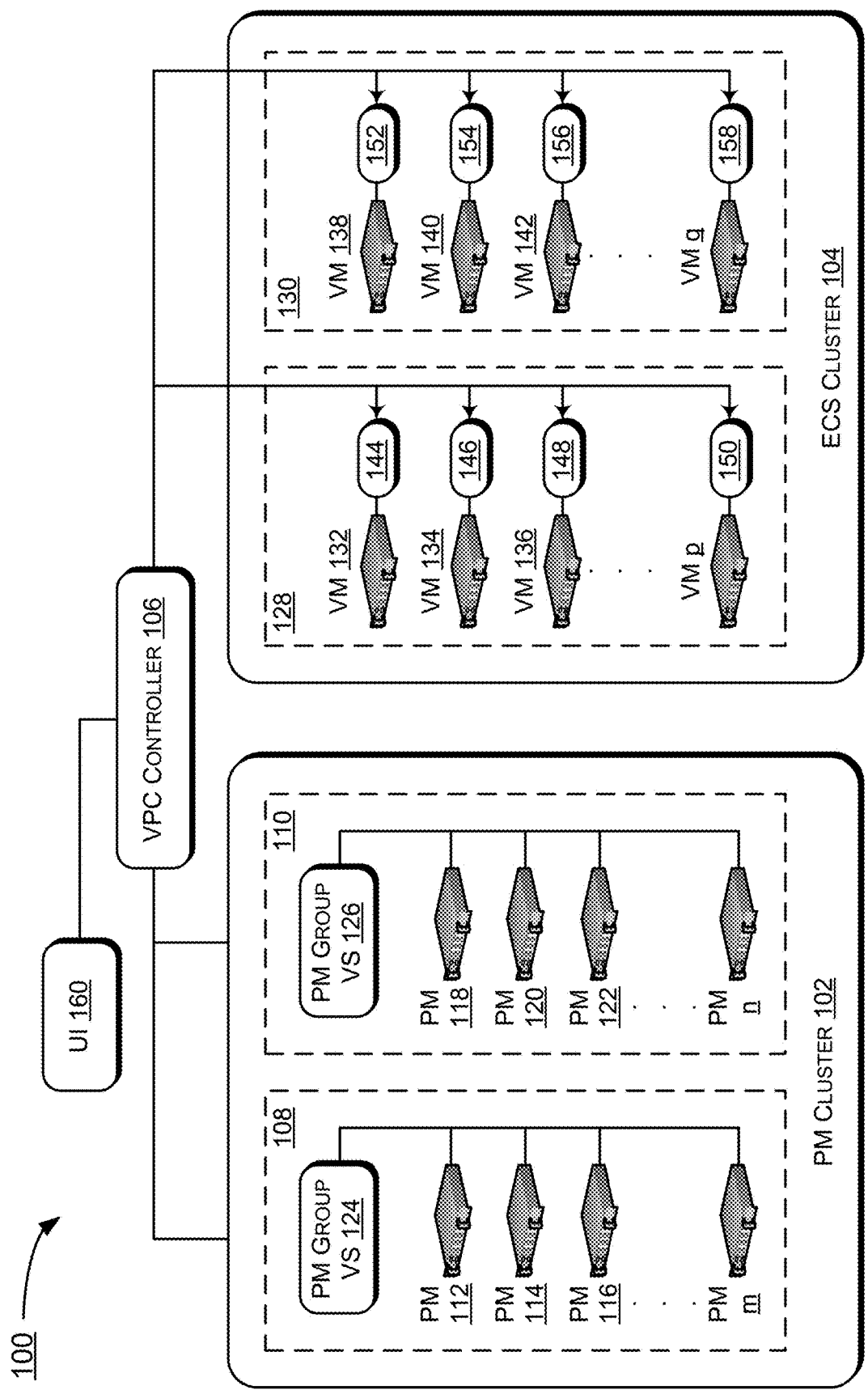
FIG. 1 illustrates an example block diagram of a system for public cloud virtual private cloud (VPC) services for providing physical machine servers and virtual machines.

FIG. 1 illustrates an example block diagram of a system 100 for public cloud virtual private cloud (VPC) services for providing physical machine servers and virtual machines. The system 100 may comprise a physical machine (PM) cluster 102, an elastic compute service (ECS) cluster 104, and a VPC controller 106 communicatively coupled to the PM cluster 102 and the ECS cluster 104.

The PM cluster 102 may comprise a plurality of groups of PM servers (two groups, 108 and 110, are illustrated for this example). Each group of PM servers may include a plurality of PM servers (four PM servers, 112, 114, 116, and m for the group 108, and four PM servers 118, 120, 122, and n for the group 110 are illustrated for this example), and each group of PM servers may connected to a corresponding PM group virtual switch (VS) (a PM group VS 124 for the PM group 108 and a PM group VS 126 for the PM group 110).

The ECS cluster 104 may comprise a plurality of groups of virtual machine (VM) servers (two groups, 128 and 130, are illustrated for this example). Each group of VM servers may include a plurality of VM servers (four VM servers, 132, 134, 136, and p for the group 128, and four VM servers 138, 140, 142, and q for the group 130 are illustrated for this example). In contrast to the PM servers in the PM cluster 102, each VM server in the ECS cluster 104 is connected a corresponding VM virtual switch (144, 146, 148, and 150 for the VM server group 128, and 152, 154, 156, and 158 for the VM server group 130).

The VPC controller 106 may be communicatively coupled to the PM cluster 102 and the ECS cluster 104 by connecting to the PM group virtual switches 124 and 126 in the PM cluster 102, and to the VM virtual switches 144, 146, 148, 150, 152, 154, 156, and 158 in the ECS cluster 104. The VPC controller 106 may be configured to control these virtual switches and the VM virtual switches and select one PM server, such as the PM server 112, of the PM server group 108 in the PM cluster 106 for running an application. Each server group (108, 110, 128, and 130) may also include a top of the rack (ToR) switch (not shown) which connects to the servers within the group, outside network, and the VPC controller 106. The PM group virtual switches 124 and 126 may be run on the ToRs of the corresponding PM server groups.

The system 100 may further comprise a user interface (UI) 160 communicatively coupled to the VPC controller 106. The UI 160 may be configured to receive a user input, which may indicate to run the application on a PM server, such as the PM server 112 rather than being run a virtual machine realized from one or more VM servers in the ECS cluster 104. Based on the user input received by the UI 160, the VPC controller 106 may select at least one PM server, such as the PM server 112 from the PM cluster 102.

Figure 2C:
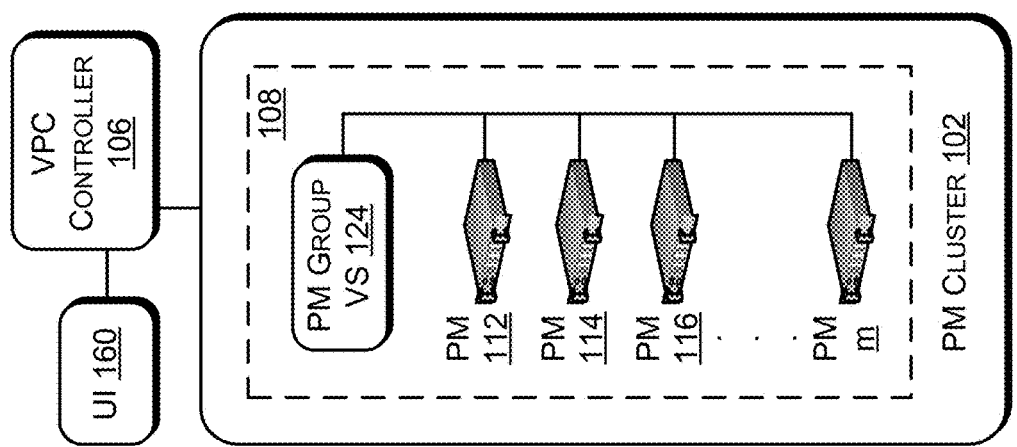
FIGS. 2A-2C illustrate example block diagrams of configuring a physical machine server group.
Figure 2B:
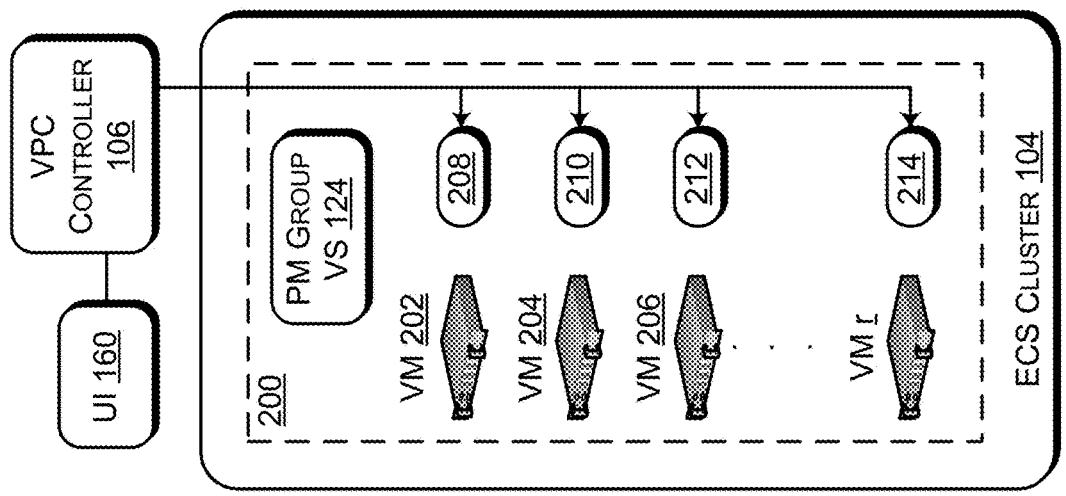
Figure 2A:
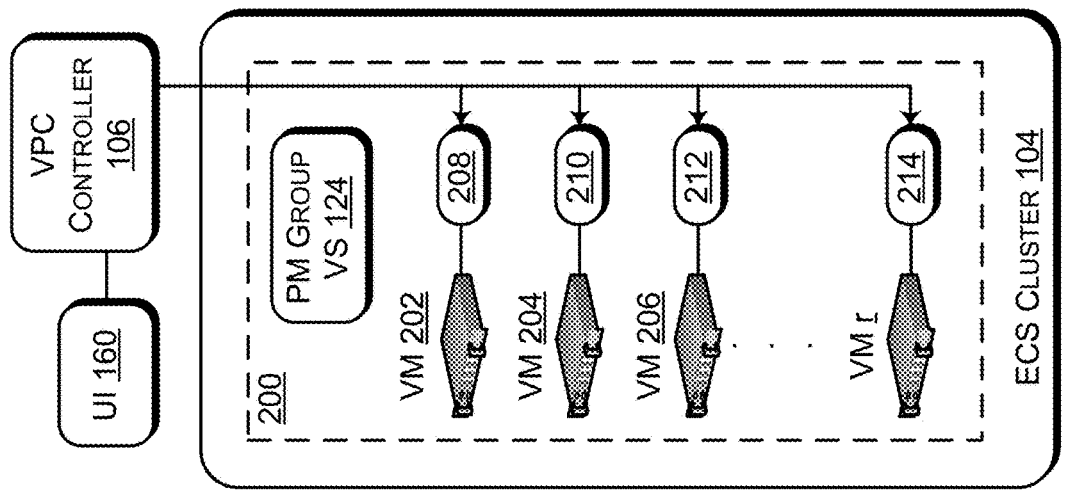

FIGS. 2A, 2B, and 2C illustrate example block diagrams of configuring a physical machine server group. Initially, as shown in block FIG. 2A, the ECS cluster 104 may include a preselected group of VM servers 200 that may be converted to a group of PM servers, such as the PM group 108. The preselected VM server group 200 may comprise, similar to the VM server groups 128 and 130, a plurality of VM servers (four VM servers, 202, 204, 206, and r, are illustrated for this example), and each VM server of the VM server group 200 is connected a corresponding VM virtual switch (208, 210, 212, and 214). The preselected VM server group 200 may also include an unconnected PM group virtual switch, such as the PM group virtual switch 124 that is unconnected.

Upon receiving the user input at the UI 160 indicating to run the application on a PM server, the VPC controller 106 may disconnect the VM virtual switches 208, 210, 212, and 214, from the corresponding VM servers, 202. 204, 206, and r as shown in FIG. 2B. The VPC controller 106 may then connect the PM group virtual switch 124 to each VM server in the preselected VM server group 200. The preselected VM server group 200 may be designated as the PM server 108 in the PM cluster 102 and each VM server of the preselected group of VM servers 202 as a PM server as shown in FIG. 2C.

If the UI 160 receives a user input without an indication of the application to be run on a PM server, then the VPC controller 106 may select at least one VM server from the ECS cluster 104 to run the application in a VM environment.

Figure 3:
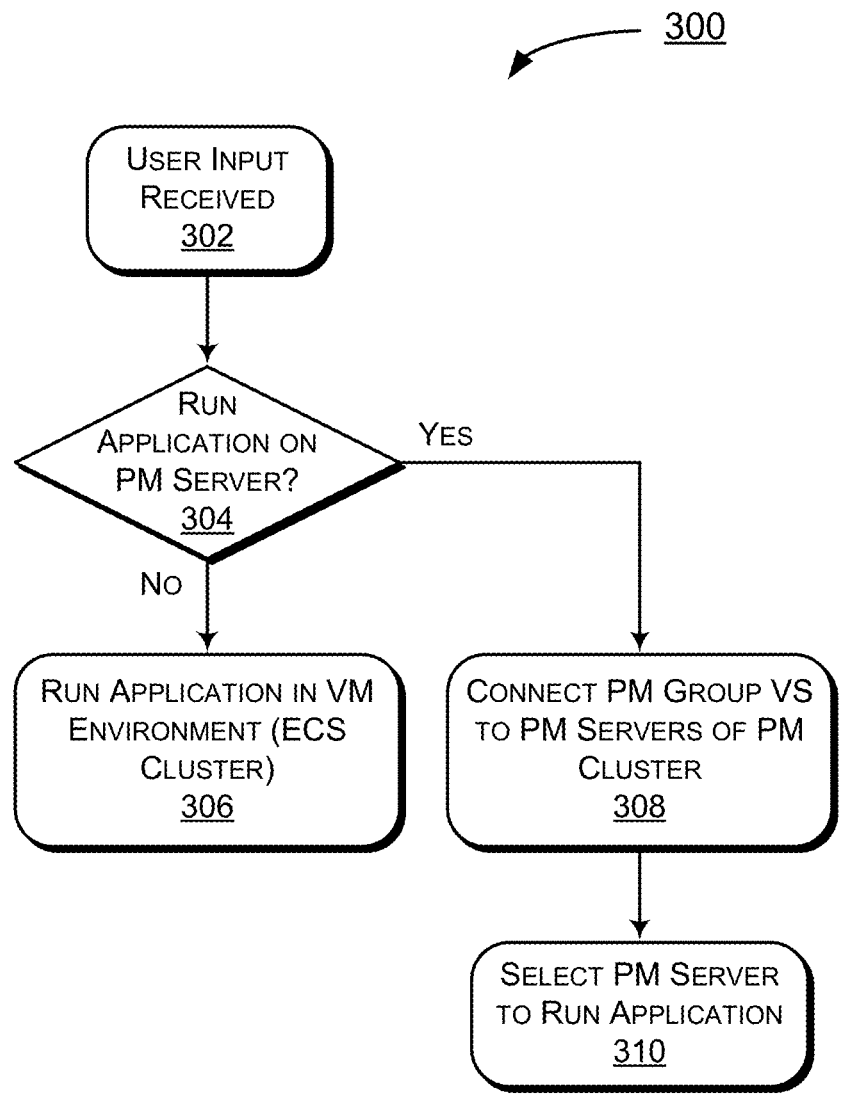
FIG. 3 illustrates an example process in public cloud VPC services for providing physical machine servers and virtual machines.

FIG. 3 illustrates an example process 300 in public cloud VPC services for providing physical machine servers and virtual machines.

At block 302, a user input may be received by a user interface (UI), such as the UI 160 as described above with reference to FIG. 1. The user input may then be evaluated for an indication to run an application on a physical machine server, such as the PM server 112 in block 304. If no indication to run the application on a PM server is detected in block 304, then at least one VM server in the ECS cluster 104, such as VM server 132 in FIG. 1, may be selected to run the application in a VM environment in block 306. Alternatively, or additionally, more than one VM servers may be selected to create a VM environment for the application to be run.

If an indication to run the application on a PM server is detected in block 304, the VPC controller 106 may, at block 308, connect PM servers, such as the PM servers of the PM server group 108 to a PM group virtual switch, such as the PM group VS 106, as discussed above with reference to FIG. 1. The PM server group 108 may be a first group of a plurality of groups of PM servers in the PM cluster, and each group of PM servers may be connected to a corresponding group virtual switch as discussed above with reference to FIG. 1. The VPC controller 106 may then select a PM server, such as the PM server 112, to run the application in block 310.

Figure 4:
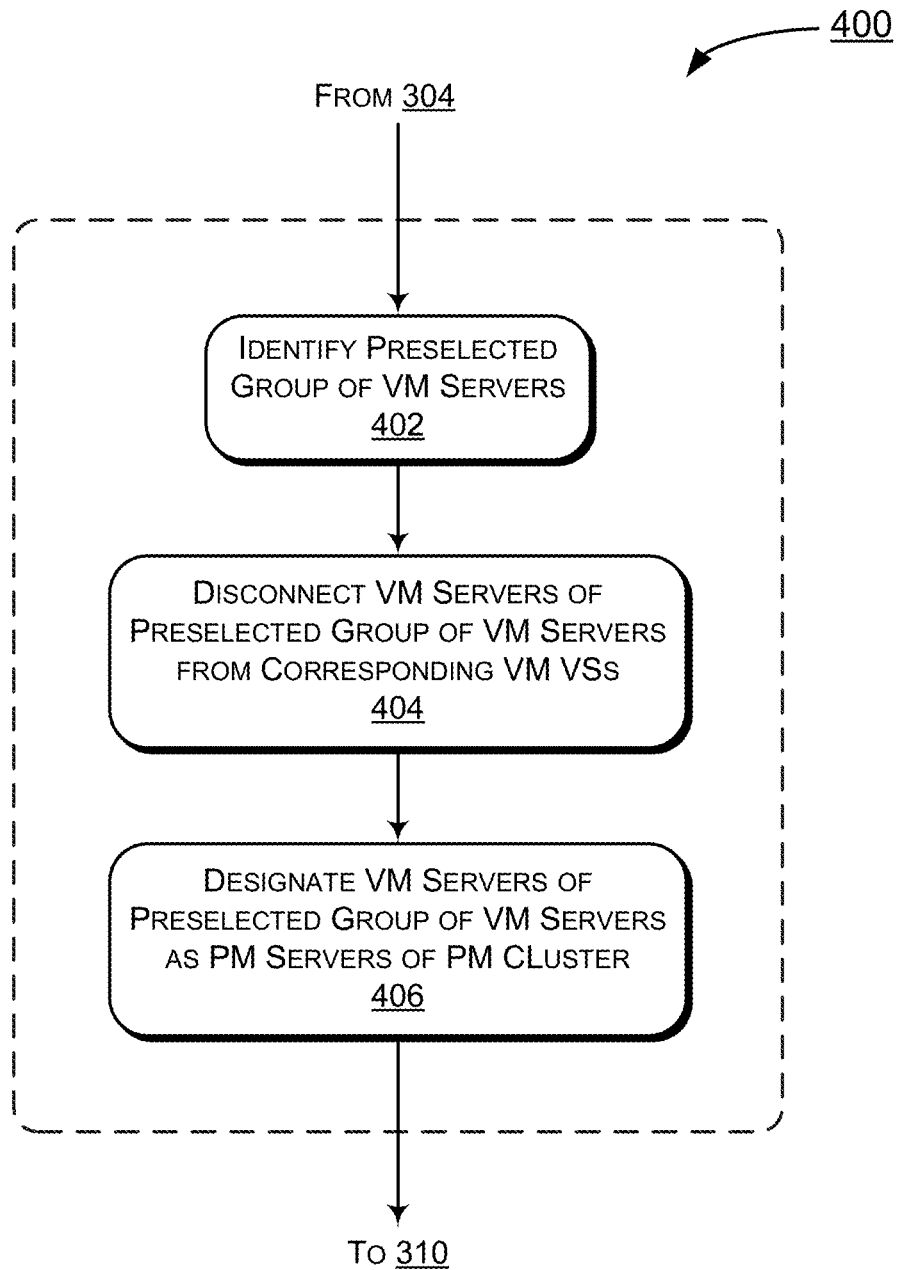
FIG. 4 illustrates an example process detailing one of the blocks of FIG. 3.

FIG. 4 illustrates an example process 400 detailing block 308 of FIG. 3.

In response to receiving the user input put in block 302 and determining that the user input has an indication to run the application on a PM server in block 304, a preselected group of VM servers, such as the preselected group of VM servers 200, in the ECS cluster 104 may be identified in block 402 as described above with referenced to FIG. 2A. In block 404, each VM server of the preselected group of VM servers, such as the VM servers 202, 204, 206, . . . r of the preselected group of VM servers 200, may be disconnected from the corresponding VM virtual switch, such as the VM virtual switches, 208, 210, 212, and 214, as described above with referenced to FIG. 2B. In block 406, the VM servers 202, 204, 206, and r of the preselected group of VM servers 200 may be connected to a PM group virtual switch, such as the PM group virtual switch 106. The VM servers 202, 204, 206, . . . r of the preselected group of VM servers 200 may be designated as a group of PM servers, such as the PM server group 108, and the VM servers 202, 204, 206, . . . r may be designated as PM servers, such as the PM servers 112, 114, 116, . . . m of the PM cluster 102.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A system for a virtual private cloud service, the system comprises: a physical machine (PM) cluster including a group of PM servers that are connected to a PM group virtual switch and include a plurality of PM servers; an elastic compute service (ECS) cluster including a plurality of virtual machine (VM) servers, each of which is connected to a corresponding VM virtual switch of a plurality of VM switches; and a controller communicatively coupled to the PM cluster and the ECS cluster, the controller configured to control the PM group virtual switch and the VM virtual switches, and to select, via the PM group virtual switch, at least one PM server of the plurality of PM servers in the PM cluster for running an application.

B. The system as paragraph A recites, wherein the group of PM servers is a first group of a plurality of groups of PM servers in the PM cluster, each group of PM servers connected to a corresponding group virtual switch, each group of PM servers comprises a plurality of PM servers.

C. The system as paragraph A recites, further comprises a user interface (UI) communicatively coupled to the controller, the UI configured to receive a user input indicative of the application to be run on a PM server, wherein the controller is further configured to select the at least one PM server based on the user input for running the application.

D. The system as paragraph C recites, wherein the controller is further configured to cause the group of PM servers to connect to the PM group virtual switch based on the user input indicative of the application to be run on a PM server.

E. The system as paragraph D recites, wherein the controller is further configured to create the PM cluster from a preselected group of VM servers in the ECS cluster based on the user input, and to designate the preselected group of VM servers as the group of PM servers and each VM server of the preselected group of VM servers as a PM server.

F. The system as paragraph E recites, wherein the controller is further configured to disconnect each VM server of the preselected group of VM servers from a corresponding VM virtual switch.

G. The system as paragraph C recites, wherein the UI is further configured to receive a user input without an indication of the application to be run on a PM server, and the controller is further configured to select at least one VM server of the plurality of VM servers in the ECS cluster based on the user input to run the application in a VM, the VM comprising the at least one VM server of the ECS cluster.

H. A method comprises connecting a group of physical machine (PM) servers of a PM cluster to a PM group virtual switch; controlling the PM group virtual switch and a plurality of virtual machine (VM) virtual switches, a VM virtual switch connected to a corresponding VM server of a plurality of VM servers in an elastic compute service (ECS) cluster; and selecting, via the PM group virtual switch, at least one PM server of the plurality of PM servers in the PM cluster for running an application.

I. The method as paragraph H recites, wherein the group of PM servers is a first group of a plurality of groups of PM servers in the PM cluster, each group of PM servers connected to a corresponding group virtual switch, each group of PM servers comprises a plurality of PM servers.

J. The method as paragraph H recites, further comprises, prior to connecting the group of PM servers of the PM cluster to the PM group virtual switch, receiving a user input indicative of the application to be run on a PM server; and selecting the at least one PM server based on the user input for running the application.

K. The method as paragraph J recites, wherein connecting the group of PM servers to the PM group virtual switch is based on the user input indicative of the application to be run on a PM server.

L. The method as paragraph K recites, further comprises, prior to connecting the group of PM servers of the PM cluster to the PM group virtual switch, creating the PM cluster from a preselected group of VM servers in the ECS cluster based on the user input; and designating the preselected group of VM servers as the group of PM servers and each VM server of the preselected group of VM servers as a PM server.

M. The method as paragraph L recites, further comprises disconnecting each VM server of the preselected group of VM servers from a corresponding VM virtual switch.

N. The method as paragraph H recites, further comprises receiving a user input without an indication of the application to be run on a PM server, and selecting at least one VM server of the plurality of VM servers in the ECS cluster based on the user input to run the application in a VM, the VM comprising the at least one VM server of the ECS cluster.

O. One or more non-transitory computer-readable storage media that store computer-readable instructions executable by one or more processors, that when executed by the one or more processors, cause the one or more processors to perform operations comprising: connecting a group of physical machine (PM) servers of a PM cluster to a PM group virtual switch; controlling the PM group virtual switch and a plurality of virtual machine (VM) virtual switches, a VM virtual switch connected to a corresponding VM server of a plurality of VM servers in an elastic compute service (ECS) cluster; and selecting, via the PM group virtual switch, at least one PM server of the plurality of PM servers in the PM cluster for running an application.

P. The one or more non-transitory computer-readable storage media as paragraph O recites, wherein the group of PM servers is a first group of a plurality of groups of PM servers in the PM cluster, each group of PM servers connected to a corresponding group virtual switch, each group of PM servers comprises a plurality of PM servers.

Q. The one or more non-transitory computer-readable storage media as paragraph O recites, wherein the operations further comprise, prior to connecting the group of PM servers of the PM cluster to the PM group virtual switch, receiving a user input indicative of the application to be run on a PM server; and selecting the at least one PM server based on the user input for running the application.

R. The one or more non-transitory computer-readable storage media as paragraph Q recites, wherein connecting the group of PM servers to the PM group virtual switch is based on the user input indicative of the application to be run on a PM server.

S. The one or more non-transitory computer-readable storage media as paragraph R recites, wherein the operations further comprise, prior to connecting the group of PM servers of the PM cluster to the PM group virtual switch, creating the PM cluster from a preselected group of VM servers in the ECS cluster based on the user input; disconnecting each VM server of the preselected group of VM servers from a corresponding VM virtual switch; and designating the preselected group of VM servers as the group of PM servers and each VM server of the preselected group of VM servers as a PM server.

T. The one or more non-transitory computer-readable storage media as paragraph O recites, wherein the operations further comprise receiving a user input without an indication of the application to be run on a PM server; and selecting at least one VM server of the plurality of VM servers in the ECS cluster based on the user input to run the application in a VM, the VM comprising the at least one VM server of the ECS cluster.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for a virtual private cloud service, the system comprising:
a physical machine (PM) cluster including a group of PM servers, the group of PM servers connected to a PM group virtual switch, the group of PM servers including a plurality of PM servers;
an elastic compute service (ECS) cluster including a plurality of virtual machine (VM) servers, each of the plurality of VM servers connected to a corresponding VM virtual switch of a plurality of VM switches; and
a public cloud virtual private cloud (VPC) controller communicatively coupled to the PM cluster and the ECS cluster, the public cloud VPC controller configured to:
control the PM group virtual switch and the VM virtual switches,
select, via the PM group virtual switch, at least one PM server of the plurality of PM servers in the PM cluster for running an application by creating the PM cluster from a preselected group of VM servers in the ECS cluster based on a user input and designating the preselected group of VM servers as the group of PM servers and each VM server of the preselected group of VM servers as a PM server,
disconnect each VM server of a preselected group of VM servers from a corresponding VM virtual switch, and
connect the group of PM servers of the PM cluster to the PM group virtual switch to run the application on the at least one PM server.

2. The system of claim 1, wherein the group of PM servers is a first group of a plurality of groups of PM servers in the PM cluster, each group of PM servers connected to a corresponding group virtual switch, each group of PM servers comprises a plurality of PM servers.

3. The system of claim 1, further comprising:
a user interface (UI) communicatively coupled to the public cloud VPC controller, the UI configured to receive the user input indicative of the application to be run on a PM server,
wherein the public cloud VPC controller is further configured to select the at least one PM server based on the user input for running the application.

4. The system of claim 3, wherein the public cloud VPC controller is further configured to cause the group of PM servers to connect to the PM group virtual switch based on the user input indicative of the application to be run on a PM server.

5. The system of claim 3, wherein the UI is further configured to receive a user input without an indication of the application to be run on a PM server, and
wherein public cloud VPC the controller is further configured to select at least one VM server of the plurality of VM servers in the ECS cluster based on the user input to run the application in a VM, the VM comprising the at least one VM server of the ECS cluster.

6. A method comprising:
connecting a group of physical machine (PM) servers of a PM cluster to a PM group virtual switch;
controlling the PM group virtual switch and a plurality of virtual machine (VM) virtual switches, a VM virtual switch connected to a corresponding VM server of a plurality of VM servers in an elastic compute service (ECS) cluster;
selecting, via the PM group virtual switch, at least one PM server of the plurality of PM servers in the PM cluster for running an application by creating the PM cluster from a preselected group of VM servers in the ECS cluster based on a user input and designating the preselected group of VM servers as the group of PM servers and each VM server of the preselected group of VM servers as a PM server,
disconnecting each VM server of a preselected group of VM servers from a corresponding VM virtual switch, and
connecting the group of PM servers of the PM cluster to the PM group virtual switch to run the application on the selected at least one PM server.

7. The method of claim 6, wherein the group of PM servers is a first group of a plurality of groups of PM servers in the PM cluster, each group of PM servers connected to a corresponding group virtual switch, each group of PM servers comprises a plurality of PM servers.

8. The method of claim 6, further comprising:
prior to connecting the group of PM servers of the PM cluster to the PM group virtual switch, receiving a user input indicative of the application to be run on a PM server; and
selecting the at least one PM server based on the user input for running the application.

9. The method of claim 8, wherein connecting the group of PM servers to the PM group virtual switch is based on the user input indicative of the application to be run on a PM server.

10. The method of claim 6, further comprising:
receiving a user input without an indication of the application to be run on a PM server, and
selecting at least one VM server of the plurality of VM servers in the ECS cluster based on the user input to run the application in a VM, the VM comprising the at least one VM server of the ECS cluster.

11. One or more non-transitory computer-readable storage media storing computer-readable instructions executable by one or more processors, that when executed by the one or more processors, cause the one or more processors to perform operations comprising:
connecting a group of physical machine (PM) servers of a PM cluster to a PM group virtual switch;
controlling the PM group virtual switch and a plurality of virtual machine (VM) virtual switches, a VM virtual switch connected to a corresponding VM server of a plurality of VM servers in an elastic compute service (ECS) cluster;
selecting, via the PM group virtual switch, at least one PM server of the plurality of PM servers in the PM cluster for running an application by creating the PM cluster from a preselected group of VM servers in the ECS cluster based on a user input and designating the preselected group of VM servers as the group of PM servers and each VM server of the preselected group of VM servers as a PM server;
disconnecting each VM server of a preselected group of VM servers from a corresponding VM virtual switch; and
connecting the group of PM servers of the PM cluster to the PM group virtual switch to run the application on the at least one PM server.

12. The one or more non-transitory computer-readable storage media of claim 11, wherein the group of PM servers is a first group of a plurality of groups of PM servers in the PM cluster, each group of PM servers connected to a corresponding group virtual switch, each group of PM servers comprises a plurality of PM servers.

13. The one or more non-transitory computer-readable storage media of claim 11, wherein the operations further comprise:
  prior to connecting the group of PM servers of the PM cluster to the PM group virtual switch, receiving a user input indicative of the application to be run on a PM server; and
  selecting the at least one PM server based on the user input for running the application.

14. The one or more non-transitory computer-readable storage media of claim 13, wherein connecting the group of PM servers to the PM group virtual switch is based on the user input indicative of the application to be run on a PM server.

15. The one or more non-transitory computer-readable storage media of claim 11, wherein the operations further comprise:
  receiving a user input without an indication of the application to be run on a PM server; and
  selecting at least one VM server of the plurality of VM servers in the ECS cluster based on the user input to run the application in a VM, the VM comprising the at least one VM server of the ECS cluster.

* * * * *